(12) United States Patent
Mikkelson et al.

(10) Patent No.: US 6,875,357 B1
(45) Date of Patent: Apr. 5, 2005

(54) PROCESS AND APPARATUS FOR TREATMENT OF WASTE WATER

(75) Inventors: Kenneth A. Mikkelson, Madison, WI (US); Lloyd W. Johnson, Roscoe, IL (US)

(73) Assignee: Aqua-Aerobic Systems, Inc., Lores Park, IL (US)

( * ) Notice: Subject to any disclaimer, the term of this patent is extended or adjusted under 35 U.S.C. 154(b) by 0 days.

(21) Appl. No.: 09/525,842

(22) Filed: Mar. 15, 2000

(51) Int. Cl.$^7$ .................................................. C02F 3/00
(52) U.S. Cl. ....................................................... 210/630
(58) Field of Search ................................ 210/605, 630, 210/620

(56) References Cited

U.S. PATENT DOCUMENTS

| | | | |
|---|---|---|---|
| 5,228,996 A | | 7/1993 | Lansdell |
| 5,304,308 A | * | 4/1994 | Tsumura |
| 5,624,565 A | * | 4/1997 | Lefevre |
| 5,997,743 A | | 12/1999 | Ahn et al. |
| 6,113,789 A | * | 9/2000 | Burke |
| 6,190,554 B1 | * | 2/2001 | Mandt |

OTHER PUBLICATIONS

Metcalf & Eddy, Inc., "Wastewater Engineering: Treatment, Disposal, and Reuse," 3$^{rd}$ edn., Irwin McGraw–Hill, 1991, p400–401.*
Video Titled: Aqua SBR with three parts titled: 1. Fundamentals of Sequencing Batch Reactor Technology 2. Industrial Applications 3. Sequencing Batch Reactor.
Mikkelson, Kenneth A., Aquasbr Design Manual, Copyright 1995 Aqua–Aerobic Systems, Inc. pp. 1–99.
Aqua–Aerobic Systems, Inc., "Sequencing Batch Reactor AquaSBR", Mar. 1994, pp 1–4, Bulletin No. 950C.
Zenon Environmental Inc., "Company Overview", Sep. 1999, 14 pages from company site on the World Wide Web.
WorldWide Water Systems, Inc., "Overview of Membrane Technologies", Oct. 1999, pp 1–5.
Mitsubishi Rayon Co., Ltd., Brochure for: "Sterapore HF–Membrane filter unit for waste water treatment", 4 pages.
Mitsubishi Rayon Co., Ltd., Brochure for: "Waste Water Treatment Equipment with Tank–Submerged Type Filter Unit Composed of Hollow Fiber Membrane", 26 pages.
Mitsubishi Rayon Co., Ltd., "Technical Letter Sterapore HF: Engineering Information", pp 1–11.
McGee et al., "Membrane Microfiltration of Secondary Wastewater Effluent", Oct. 6, 1999, pp1–2.
Mitsubishi Rayon Co., Ltd., "Mitsubushi Rayon Hydrophilic Hollow Fiber Membrane", 15 pages from company site on the World Wide Web.
Peters et al., "Membrane bioreactors in wastewater treatment", Jan./Feb. 2000 issue of *Filtration + Separation* pp18–21.

* cited by examiner

*Primary Examiner*—Chester T. Barry
(74) *Attorney, Agent, or Firm*—Niro, Scavone, Haller & Niro

(57) ABSTRACT

A process for removing organic contaminants, nutrients and suspended solids from waste water. A three-phase cycle is used, consisting of a mix fill phase, a react fill phase and a react discharge phase. The process eliminates the need for separate basins for anaerobic and anoxic conditions, appropriate time periods for a quiescent environment for solids/liquid separation and mechanical decanter devices normally required to extract the desired effluent quality in conventional sequencing batch reactor systems.

4 Claims, 5 Drawing Sheets

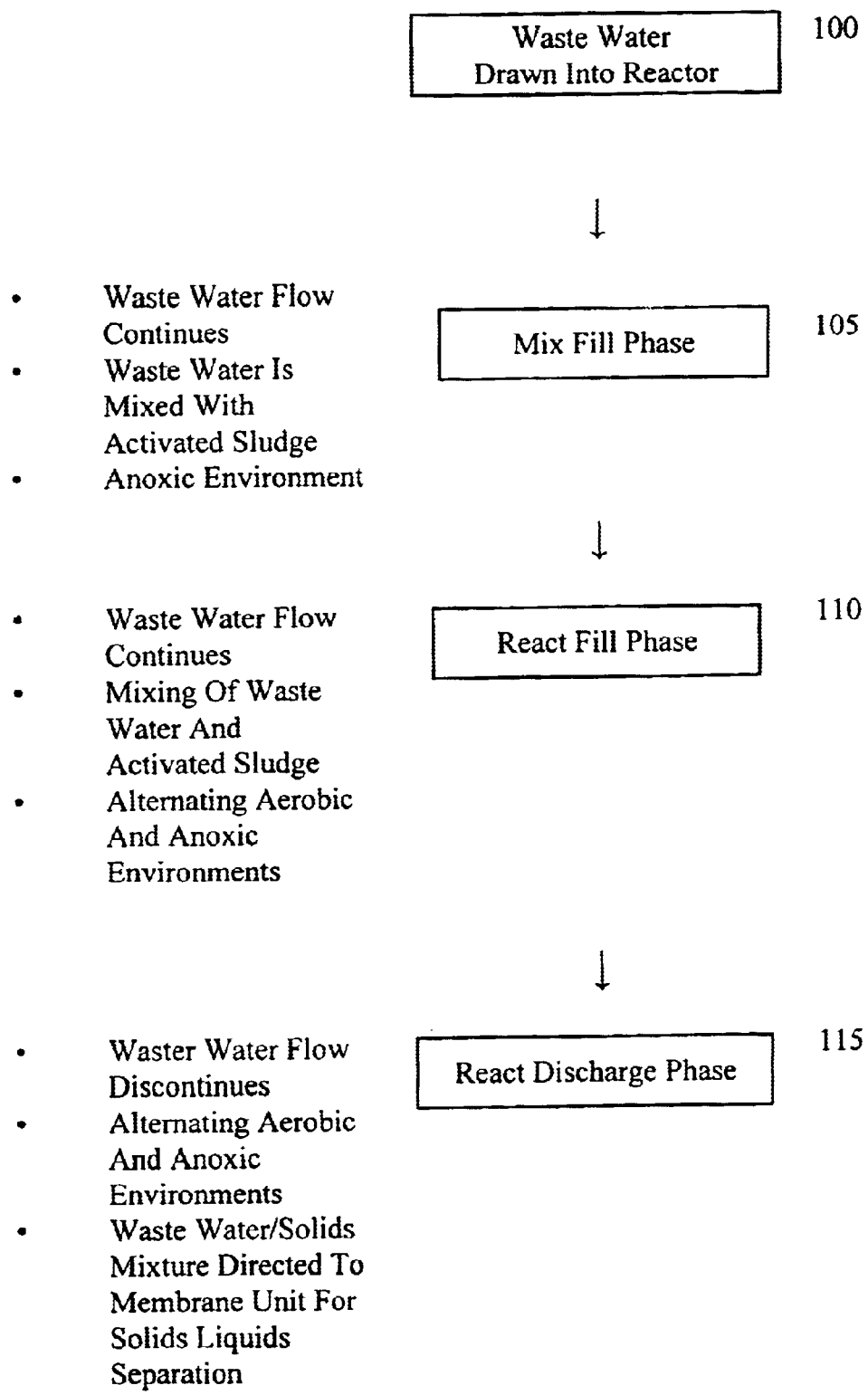

(FIGURE 1B CONTINUED)

- No Water Flow
- No Mixing
- No Aeration
- Quiescent Environment For Solids/Liquid Separation Settle Phase — 140

↓

- Quiescent Environment
- Mechanical Decanter Used To Remove Purified Liquid

Decant Phase — 145

↓

- Quiescent Conditions
- Further Sedimentation
- Phase Time Adjustment

Idle Phase — 150

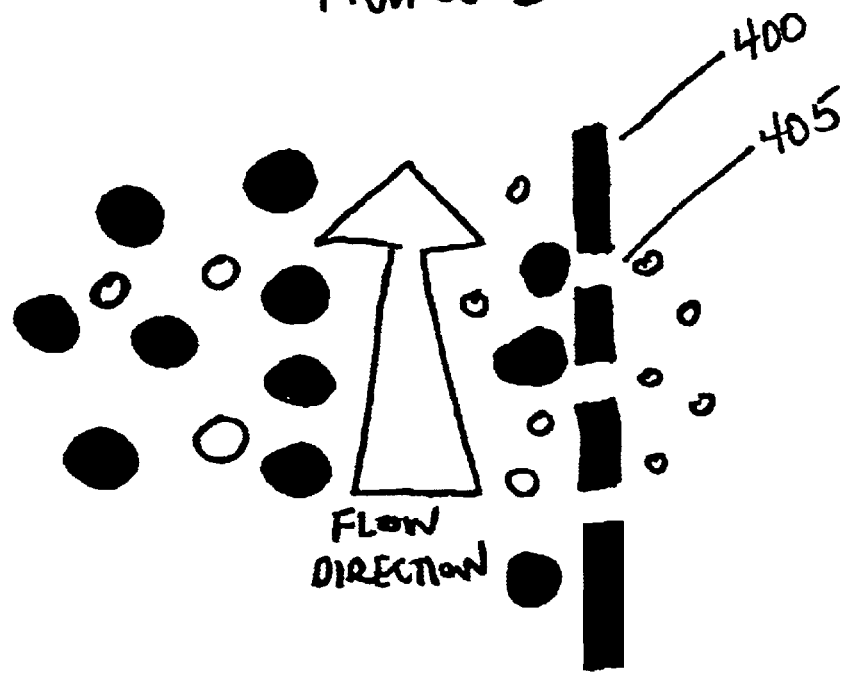

PROCESS AND APPARATUS FOR TREATMENT OF WASTE WATER

FIELD OF THE INVENTION

The present invention relates generally to processes and apparatus for the treatment of waste water and, more particularly, to processes and apparatus for efficiently removing organic contaminants, nutrients and suspended solids from waste water using a sequencing batch reactor system in conjunction with a membrane filter device.

BACKGROUND OF THE INVENTION

The claimed invention involves the use of microorganisms, for example, bacteria in activated sludge, to metabolize organic contaminants in waste water while simultaneously removing nutrients such as nitrogen and phosphates, in conjunction with a membrane to effect the removal of suspended solids from waste water.

Organic compounds in waste water typically have a high biochemical oxygen demand (BOD). Under aerobic conditions, bacteria in activated sludge metabolize this BOD in three ways: (1) substrate oxidation in which organic compounds are converted to carbon dioxide and water; (2) synthesis in which organic compounds and nutrients are converted to cell protoplasm; and (3) endogenous respiration in which protoplasm is converted to carbon dioxide, nutrients and water.

Nitrogen is typically present in waste water in the forms of organic nitrogen and ammonia ($NH_4^+$). The process of removing this contaminant requires two distinct steps in which organic nitrogen is hydrolyzed and ammonia is converted to free nitrogen gas ($N_2$) which can readily be stripped from solution to the atmosphere. First, in the nitrification process, ammonia is converted to nitrite ($NO_2^-$) by autotrophic oxidation involving *Nitrosomonas* spp. and related organisms, followed by further oxidation to nitrate ($NO_2^-$) involving *Nitrobacter* spp. Second, in the denitrification process, a relatively broad range of heterotrophic facultative organisms convert nitrate to free nitrogen ($N_2$) in a series of steps.

It is apparent that the nitrogen removal process, as described above, requires first an aerobic step in which the oxidation of ammonia to nitrate takes place (nitrification), followed by an anoxic step in which facultative organisms convert nitrate and nitrite to free nitrogen which can be released (denitrification).

The removal of phosphates takes place in two steps and is mediated by a group of phosphorous rich microorganisms (Bio-P), principally *Acinetobacter* spp. and some *Aeromonas*. These organisms, when present in sludge exposed to anaerobic conditions, use stored energy in the form of poly-phosphate to absorb food materials, for example, volatile fatty acids such as acetic, propionic, or butyric acids formed in the activated sludge as a result of exposure to anaerobic conditions) and store it as poly-B-hydroxybutyrate (PHB). In the process, the organisms release phosphates as the polyphosphates are broken down to release energy. The conditions must be anaerobic rather than anoxic to allow for the depletion of nitrates which would inhibit phosphate release and the absorption of volatile fatty acids by the microorganisms.

In the second step of phosphate removal, under aerobic conditions, the aerobic bacteria contained in the activated sludge metabolize the PHB and take up phosphates as biomass increases. More phosphate is taken up by the Bio-P organisms than was previously released, a difference known as luxury uptake.

In addition to the organic and inorganic contaminants described above, waste water typically contains suspended solids in the forms of microorganisms and endogenous mass in the activated sludge and inert organic and inorganic mass in the waste water itself, which must be removed before the liquid is returned to the environment. These solids are typically 0.5 microns or greater in size. In conventional waste water treatment systems the solids are removed from the liquid through gravitational sedimentation and decanting. A quiescent environment is provided for a sufficient amount of time for the solids to separate from the liquid, and then a mechanical decanter withdraws the purified water.

Waste water treatment processes and apparatus have been developed to provide the above-described conditions necessary for the removal of organic contaminants, nitrogen, phosphates and suspended solids. For example, so-called "linear" waste water treatment processes have been developed which comprise a series of tanks or basins in which waste water is sequentially subjected to anaerobic and aerobic conditions, and is then pumped to a clarifier where suspended solids are separated from the purified liquid and the liquid is decanted.

Although this system combines anaerobic, aerobic and clarifying processes, thereby allowing for the removal of organic contaminants, inorganic nutrients and suspended solids, the system is relatively inefficient as it requires numerous tanks, large volumes of liquid and long retention times.

Conventional sequencing batch reactor (SBR) processes have been developed to address these inefficiencies. In an SBR process, waste water is mixed with activated sludge, exposed to intermittent aerobic and anoxic/anaerobic conditions and further purified through settling and decanting in a single vessel. This is typically accomplished through a series of cycles including fill, react, settle and decant phases.

In the fill phase, waste water enters the reactor where it is mixed with activated sludge therein. Aeration is typically intermittent to promote aerobic or anoxic/anaerobic conditions. In the react phase, influent flow is terminated while mixing and aeration continue. Again, aeration is typically intermittent to allow for the removal of nitrogen and phosphorous. In the settle phase, mixing and aeration cease and solids/liquid separation takes place under quiescent conditions. In the decant phase of the cycle, the mixer and aeration systems remain off and the decantable liquid volume is removed by means of a subsurface withdrawal. A typical SBR process cycle requires four to eight hours to complete.

Two reactors may be used in parallel to permit a continuous flow to the system. The total time required for the mixed fill and react fill phases in the first reactor is equal to the time required for the react, settle and decant phases in the second reactor. In this process, 100% of the flow is directed to each reactor 50% of the time. For example, flow typically enters the system for 24 hours of each day. Each reactor would receive flow for a 12-hour period. In a given 12-hour period, the first reactor may be receiving waste water, in the mixed fill and react fill phases, while the second reactor is not receiving flow, as it is in the react, settle or decant phases. At the end of the 12-hour period, the second reactor has completed its treatment cycle and is ready to receive flow for 12 hours. The first reactor begins the react, settle and decant phases.

While conventional SBR processes as described above offer significant advantages over linear and other known waste water treatment processes, such as more efficient settling, decreased operational costs and higher treatment efficiencies, conventional SBR processes nevertheless have shortcomings. For example, the settle phase of each cycle requires quiescent conditions for an appropriate period of time to allow solids/liquid separation, which can require several hours. And in some applications, particularly where the amount of solids is large or the settling characteristics of the solids are imperfect, the settling process does not adequately separate solids from the liquid. Furthermore, the decant phase of each cycle typically requires the use of an expensive mechanical device to extract the desired effluent quality.

The present invention eliminates the need for a mechanical decanter device and the necessity of settle and decant phases, while still accomplishing the removal of organic matter, nitrogen, phosphorous and suspended solids to achieve effluent quality achieved in conventional SBR systems. Specifically, the invention uses a membrane filtration device in conjunction with an SBR process to accomplish solids/liquid separation while at the same time providing alternating, mixed aerobic and anoxic/anaerobic conditions which optimize effluent quality. Since the settle and decant phases of the cycle are eliminated, greater volumes of waste water can be treated in less time as compared with conventional SBR systems. An entire treatment cycle can be completed in approximately two hours. The membrane also increases the efficiency of solids/liquid separation. Adequate separation is achieved even with large amounts of suspended solids that have imperfect settling characteristics. Moreover, because a mechanical decanting device is not needed, construction, operation and maintenance costs are less than those associated with conventional SBR systems.

BRIEF DESCRIPTION OF THE DRAWINGS

The invention will be better understood by reference to the drawings.

FIG. 1A is a flow chart showing the steps used in the water treatment method in accordance with the present invention.

FIG. 3 is diagrammatic view of a membrane in accordance with the present invention showing the flow of liquid/solids therethrough.

DETAILED DESCRIPTION OF A PREFERRED EMBODIMENT OF THE INVENTION

Set forth below is a description of what is currently believed to be a preferred embodiment or best example of the invention claimed. Future and present alternatives and modifications to this embodiment are contemplated. Any alternatives or modifications which make insubstantial changes in function, purpose, structure or result are intended to be covered by the claims of this patent.

An overview of the operation of the process and apparatus of the present invention is illustrated in the form of the flowchart at FIG. 1A. In step 100, waste water is drawn into a reactor containing an activated sludge. A three-phase treatment cycle begins with step 105, the "mix fill phase." In this phase, the waste water is thoroughly mixed with the sludge. The reactor is not aerated, thereby creating an anoxic/anaerobic environment in which phosphorous release occurs.

In the "react fill" phase of operation, step 110, waste water flow continues into the reactor. Mixing of the waste water and sludge continues. The waste water that has already entered and continues to enter the reactor represents a BOD which is sorbed, assimilated and metabolized by the sludge. To allow for the removal of nitrogen and phosphorous, aeration in the reactor is intermittent, creating alternating aerobic and anoxic environments.

Finally, in the "react discharge phase," step 115, waste water flow into the reactor ceases. The reactor continues to be intermittently aerated to create alternating aerobic and anoxic environments. The waste water is directed to a membrane device for separation of solids from the liquid.

Figure 1B:
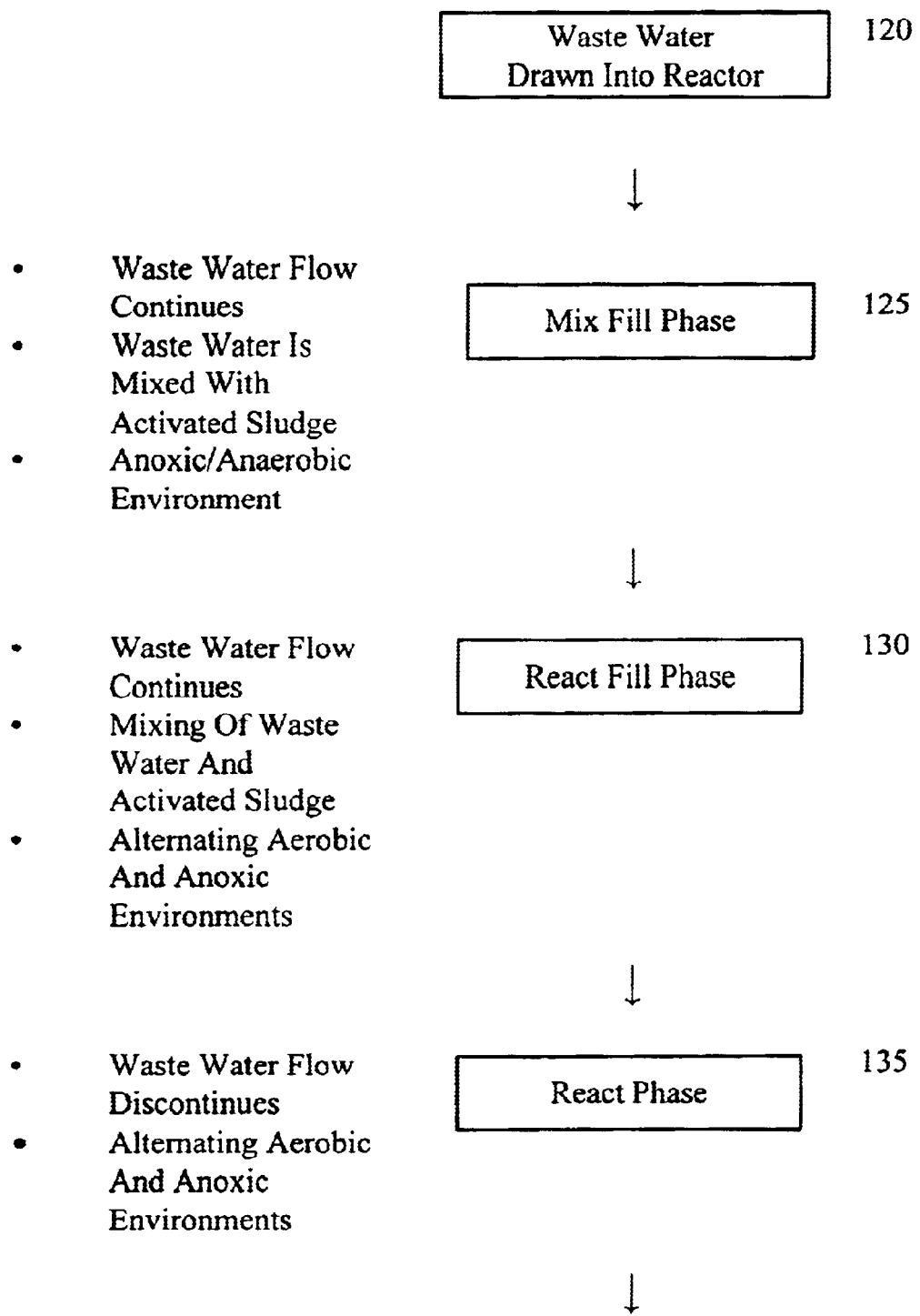
FIG. 1B is a flow chart showing the steps typically required in a conventional SBR process.

Some of the advantages of the processes and apparatus of the present invention are apparent by comparing them to a conventional SBR process, as depicted in FIG. 1B.

Like the present invention, a typical SBR process begins with the drawing of waste water into a reactor 120, followed by a mix fill phase 125 and a react fill phase 130. However, a typical SBR process then requires a separate "react phase" 135 in which mixing of the waste water and activated sludge continues and aeration is provided intermittently to further facilitate the removal of organic matter and nitrogen.

The react phase is followed by a "settle phase" 140 during which there is no waste water flow, mixing or aeration, thereby resulting in a quiescent environment for solids/liquid separation through gravitational sedimentation.

Next, a "decant phase" 145 is required in which, typically, in a quiescent environment, a mechanical decanter is used to remove purified liquid from the reactor. Finally, an "idle phase" 150 may be required to synchronize operation with a companion reactor.

The settle and decant phases are not required in the processes and apparatus of the present invention, which collapses the five-phase cycle into a three-phase cycle while providing all the benefits of conventional SBR systems in addition to the significant benefits explained herein.

Figure 2:
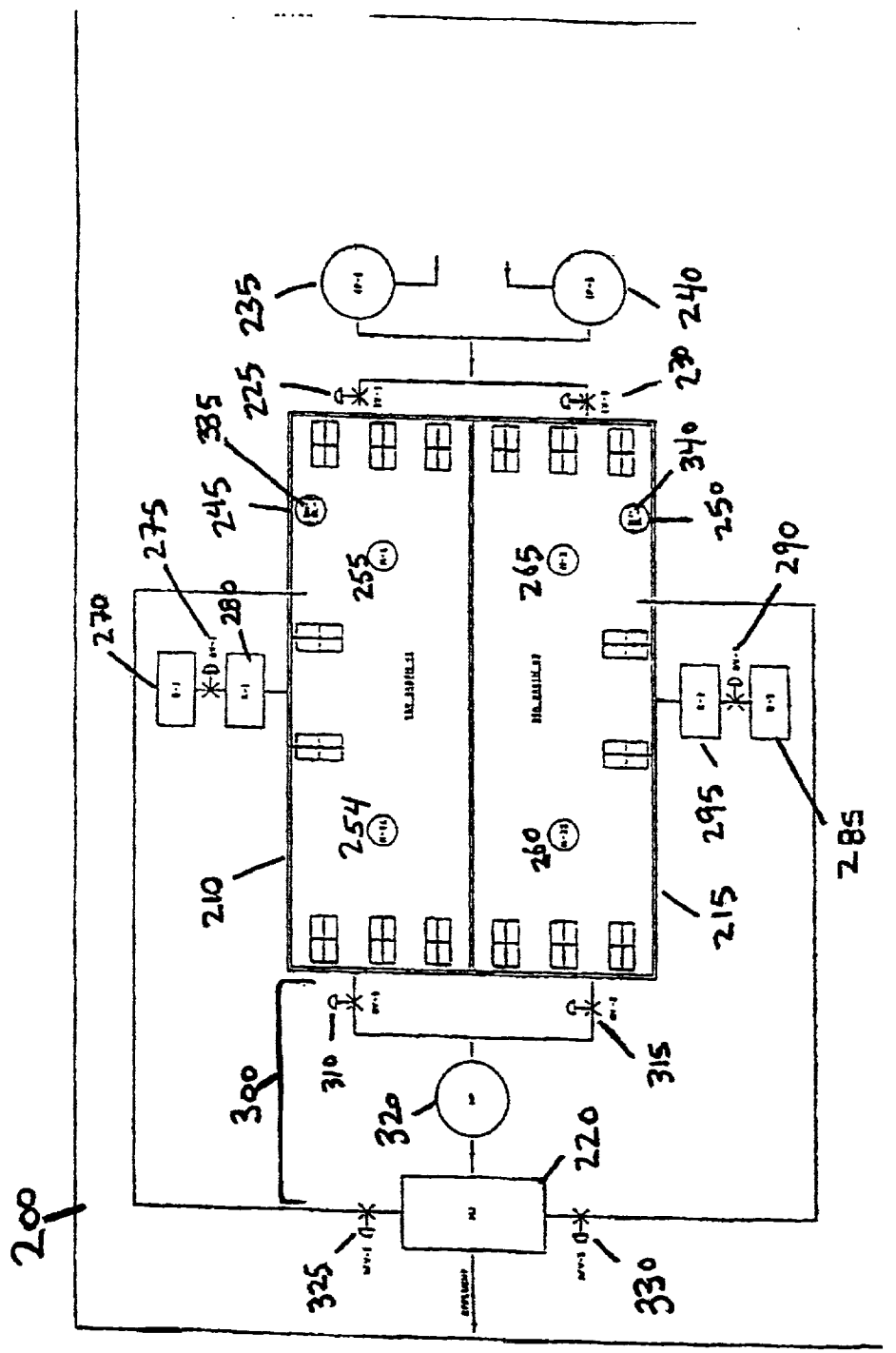
FIG. 2 is a schematic flow diagram of a water treatment system in accordance with the present invention.

FIG. 2 depicts a waste treatment system 200 that applies the principles of the present invention. The system 200 may be comprised of bioreactors 210 and 215 containing activated sludge, a membrane filtration unit 220 and accessory equipment described in detail below. While two bioreactors are used in the present embodiment, a greater number of bioreactors, or a single bioreactor, could be used in accordance with the invention. The bioreactors 210 and 215 may operate in a two-hour treatment cycle that is comprised of three phases of operation. The first phase, mix fill, may last approximately 15 minutes. The second phase, react fill, may last approximately 45 minutes. The final phase, react discharge, may last approximately 60 minutes. Where two bioreactors are used, as the first bioreactor 210 completes the mix fill and react fill phases, the second bioreactor 215 will complete the react discharge phase.

Influent may be drawn into either bioreactor 210 or 215 bioreactor as determined by the position of influent valves 225 and 230. The influent may be drawn into the bioreactors by the force of gravity or, if necessary, influent pumps 235 and 240.

Influent valve 225 opens during the mix fill and react fill phases for the first bioreactor 210 and closes during the react discharge phase. In a similar manner influent valve 230 controls the flow to the second bioreactor 215. During operation of the system 200, the influent valves 225 and 230 will either open or close to control the flow to the bioreactors 210 and 215.

Level sensors 245 and 250 may be located in bioreactors 210 and 215, respectively, to terminate flow into the bioreactors when water reaches a desired level. The first bioreactor 210 is equipped with mixers 254 and 255, and the second bioreactor 215 is equipped with mixers 260 and 265. Although the present embodiment uses two mixers in each bioreactor, any number of mixers may be used to achieve sufficient mixing of the waste water and activated sludge. In the present embodiment, the mixers operate continuously during all phases of the treatment cycle.

The first bioreactor 210 is equipped with an aerating means such as a blower 270, corresponding blower valve 275 and a rotameter 280. Similarly, the second bioreactor 215 is equipped with an aerating means such as blower 285, corresponding blower valve 290 and rotameter 295. Multiple or other aerating means, valves and rotameters may be used. In the present embodiment, each blower and corresponding blower valve is equipped with five sets of "On/Off" adjustable timer values that extend from the start of the react fill phase to the end of the react discharge phase to permit the creation of either aerobic or anoxic conditions in each bioreactor, as required.

The membrane filtration subsystem 300 withdraws flow from the first or second bioreactor 210 or 215 during the react discharge phase of the cycle for each bioreactor. The subsystem includes a membrane filtration unit 220 and discharge valves 310 and 315, which control the flow of liquid/solids from bioreactor 210 or 215 to the suction port of the membrane pump 320. Return flow valves, 325 and 330, are equipped with operators and control the return flow of liquid/solids from the membrane filtration subsystem 300 to either bioreactor 210 or 215. Membrane pump 320 operates continuously and the opening or closing of the appropriate discharge valve and return flow valve combination will permit the withdrawal and return of liquid/solids to either bioreactor. In general, discharge valve 310 and return flow valve 325 operate as either an open or closed combination and discharge valve 315 and return flow valve 330 operate in a similar manner.

Level sensor 335, located in bioreactor 210, and level sensor 340, located in bioreactor 215 may be used to terminate the flow of liquid/solids upon attaining a specified low water level by closing the discharge valve 310 or 315 and the return flow valve 325 or 330 and stopping the membrane pump 320.

The following Table I identifies the status of each of these system components during a typical two-hour treatment cycle of the present embodiment.

TABLE I

| ITEM | 0–15 min. | 15–60 min. | 60–75 min. | 75–120 min |
|---|---|---|---|---|
| Influent Pump 235 | ON | ON | ON | ON |
| Influent Pump 240 | ON | ON | ON | ON |
| Influent Valve 225 | OPEN | OPEN | CLOSED | CLOSED |
| Influent Valve 230 | CLOSED | CLOSED | OPEN | OPEN |
| Mixer 254 | ON | ON | ON | ON |
| Mixer 255 | ON | ON | ON | ON |
| Mixer 260 | ON | ON | ON | ON |
| Mixer 265 | ON | ON | ON | ON |
| Level Sensor High Water 245 | CLOSED | CLOSED | CLOSED | CLOSED |
| Level Sensor Low Water 335 | CLOSED | CLOSED | CLOSED | CLOSED |
| Level Sensor High Water 250 | CLOSED | CLOSED | CLOSED | CLOSED |

TABLE I-continued

| ITEM | 0–15 min. | 15–60 min. | 60–75 min. | 75–120 min |
|---|---|---|---|---|
| Level Sensor Low Water 340 | CLOSED | CLOSED | CLOSED | CLOSED |
| Blower 270 | OFF | ON | ON | ON |
| Blower 285 | ON | ON | OFF | ON |
| Blower Valve 275 | CLOSED | OPEN | OPEN | OPEN |
| Blower Valve 290 | OPEN | OPEN | CLOSED | OPEN |
| Discharge Valve 310 | CLOSED | CLOSED | OPEN | OPEN |
| Discharge Valve 315 | OPEN | OPEN | CLOSED | CLOSED |
| Return Flow Valve 325 | CLOSED | CLOSED | OPEN | OPEN |
| Return Flow Valve 330 | OPEN | OPEN | CLOSED | CLOSED |
| Membrane Pump 320 | ON | ON | ON | ON |

Notes:
1. Assume 50% flow on Influent Pumps 235 and 240.
2. Influent Pumps 235 and 240 will stop if High Water Level Sensor 245 or 250 is open.
3. Membrane Pump 320 will stop if Low Water Level Sensor 335 or 340 is open.
4. Blowers 270 and 285 to operate with five (5) sets of on/off times during React Fill and React Discharge.

The membrane filtration unit 220 is explained in more detail with reference to FIG. 3. The unit includes membrane 400, including pores 405. Although the present embodiment uses a single membrane, any number of membranes may be required to achieve sufficient effluent quality. The size of the pores are small enough to prevent waste water solids from passing through the membrane, but large enough to minimize the pressure required to force water through the membrane. In a typical application an ultrafiltration type membrane with a pore size ranging from 0.001 to 0.02 micron or a microfiltration type membrane with a pore size ranging from 0.1 micron to 5.0 microns is suitable, with an operating pressure in the membrane filtration subsystem 300 of about 60 psi. As will be appreciated by those skilled in the art, various pore sizes and pressures can be used, depending on the particular application.

Various membrane configurations may be used in the present invention so long as the membrane provides an adequate surface area for water processing and acceptable permeation and recovery rates, but does not clog or foul easily. Furthermore, the membrane must be made of a material that is tolerant to a wide range of temperature, and is chemically inert and resistant to constant pressurized operations. Membranes meeting these requirements are well known to persons of ordinary skill in the art.

A microfiltration capillary membrane of the type manufactured by Pall Corporation, 2200 Northern Boulevard, East Hills, N.Y. 11548 is believed to be particularly suitable for use in the present invention. The membrane is comprised of capillary membrane tubes in a housing. The average diameter of each membrane tube is about 1 to 2 mm. The direction of waste water flow is parallel to the membrane wall. Water permeates through the membrane 400 while the solids are continuously carried away from the membrane surface, thus minimizing clogging of the pores 405.

The above description is not intended to limit the meaning of the words used in the following claims that define the invention. Rather, it is contemplated that future modifications in function, purpose, structure or result will exist that are not substantial changes and that all such insubstantial changes in what is claimed are intended to be covered by the claims.

What is claimed is:

1. A three-phase process for the treatment of waste water comprising:

an initial mix fill phase having a predetermined duration in which waste water is continuously directed into a vessel containing an activated sludge, the waste water is continuously mixed with the activated sludge and the vessel environment is controlled to provide an anaerobic time period for achieving phosphorous release and denitrification of oxidized nitrogen in the vessel throughout the mix fill phase;

followed by a react fill phase having a predetermined duration in which continuous waste water flow into the vessel continues and the waste water is exposed to intermittent aeration and continuous mixing to promote completely mixed aerobic and anoxic conditions;

followed by a react discharge phase having a predetermined duration in which there is no waste water flow into the vessel, the waste water is continuously exposed to alternating periods of aerobic and anoxic conditions, and during this exposure to alternating periods of aerobic and anoxic conditions the waste water is continuously directed to a membrane device to separate suspended solids from the liquid in the waste water.

2. The process of claim 1 wherein the mix fill phase is completed in about 15 minutes.

3. The process of claim 1 wherein the react fill phase begins with continuous mixing and intermittent aeration and is completed in about 45 minutes.

4. The process of claim 1 wherein the react discharge phase begins with the cessation of waste water flow into the vessel and is completed in about 60 minutes.

* * * * *

UNITED STATES PATENT AND TRADEMARK OFFICE
CERTIFICATE OF CORRECTION

PATENT NO. : 6,875,357 B1
DATED : April 5, 2005
INVENTOR(S) : Kenneth A. Mikkelson It is certified that error appears in the above-identified patent and that said Letters Patent is hereby corrected as shown below:

Title page,
Item [73], Assignee, delete "Lores Park, IL (US)" and replace with -- Loves Park, IL (US) --

Signed and Sealed this

Seventh Day of June, 2005

JON W. DUDAS
*Director of the United States Patent and Trademark Office*